Aug. 1, 1939.   R. A. CRAWFORD   2,167,972
PROTECTIVE SURFACE
Filed Aug. 19, 1937
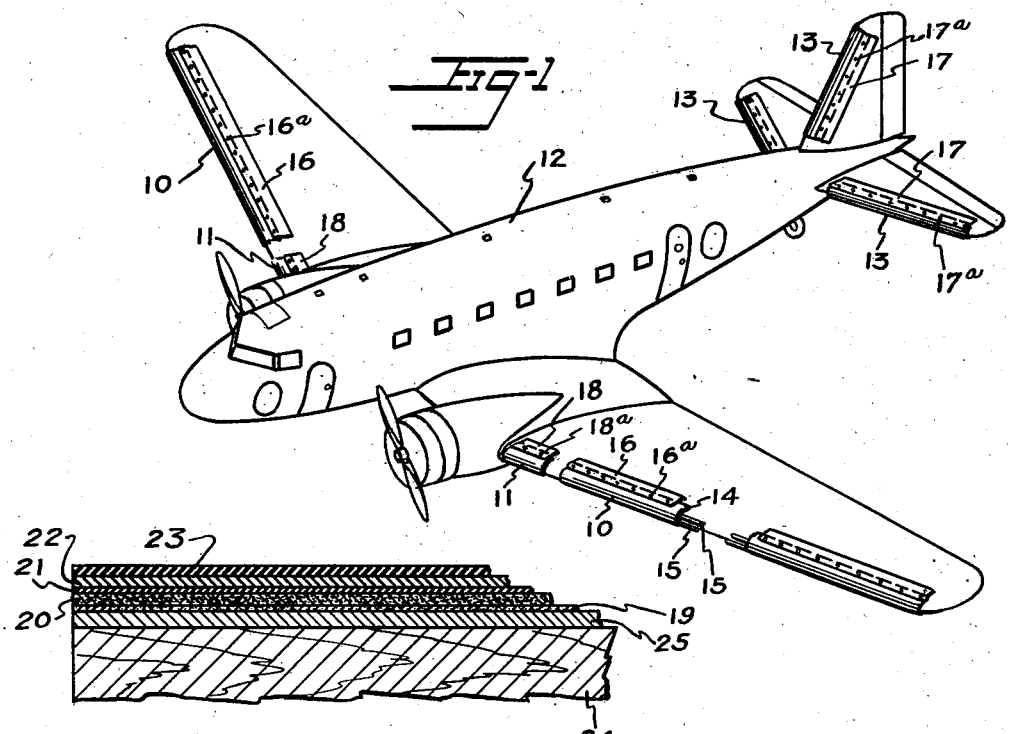
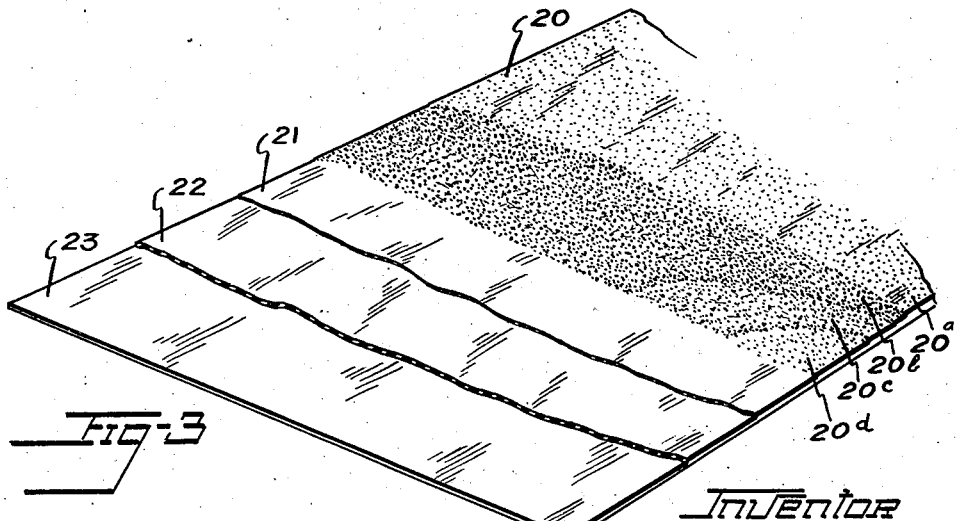
Inventor
Richard A. Crawford
By Willis F. Avery
Atty.

Patented Aug. 1, 1939

2,167,972

UNITED STATES PATENT OFFICE 2,167,972

PROTECTIVE SURFACE

Richard A. Crawford, Akron, Ohio, assignor to The B. F. Goodrich Company, New York, N. Y., a corporation of New York Application August 19, 1937, Serial No. 159,842

11 Claims. (Cl. 244—134)

This invention relates to protective surfaces, and especially to the protection of surfaces of rubber articles from the action of sun and oil, and also to the provision of electrical conductivity of the surface despite the dielectric properties of the rubber itself. The invention is applicable especially to the surfaces of rubber covering structures for air foils and other parts of aircraft, such, for example, as inflation shoes for ice removal and rubber abrasion shoes for the leading edges of air foils. The invention is useful also for the protection of other articles, for example, the sidewalls of tires, where it is desired to provide resistance to sun-checking and flex cracking of the rubber surface, and to provide electrical conductivity for charges of static electricity, the rubber itself being a poor conductor, and also for the protection of surfaces such as metallic surfaces where surface oxidation of the unprotected metal will reduce the electrical conductivity of the surface.

The chief objects of the invention are to provide electrical conductivity in the surface; to provide effectively for resisting the action of oil on the surface; to provide resistance to checking of the surface as a result of exposure to sunlight; and to provide these properties while nevertheless maintaining effectiveness of the protected structure for any flexing or distending function that it is intended to perform.

These and further objects will be apparent from the following description, reference being had to the accompanying drawing of which;

Fig. 1 is a perspective view, with parts broken away, of an airplane, showing on the leading edges of its wings and stabilizers inflatable shoes mounted thereon and constructed according to, and embodying the invention in its preferred form.

Fig. 2 is a vertical section showing the manner in which a portion of the shoe structure is assembled;

Fig. 3 is a perspective view, with parts broken away and sectioned, of the assembled and coated surface covering of the shoe.

The invention provides, among other things, for conducting away electrical charged which may accumulate upon the surfaces of articles, so that these charges will not rupture the material, or cause sparking such as to ignite fuel, or interfere with radio operation or have other harmful effect. In the case of inflatable rubber shoes on aircraft for ice removal, the prevention of such discharge is especially desirable inasmuch as the rubber of the shoes is mounted in tension, and any small opening in the rubber caused by the discharge or otherwise is very detrimental owing to the vulnerability of stretched rubber to rupture once it is broken, even though the original aperture be small. Rupture is undesirable as weakening the article and jeopardizing its airtightness and rendering it vulnerable to penetration by moisture. The provision of electrical conductivity is useful on other surfaces also, such, for example, as the surfaces of abrasion shoes of rubber or other dielectric material for aircraft and other structures, and also on the sidewalls of tires, in which the rubber of the tire owing to its high dielectric properties resists the easy discharge of static accumulation without undesirable sparking, or penetration of the material, and the provision of a conducting protective coating is sometimes desirable even on the surface of metallic articles where oxidation will reduce the conductivity.

Referring to the embodiment of the invention illustrated in the drawing, inflatable rubber shoe units 10, 10, and 11, 11, are provided at the leading edges of the wings of an airplane 12, and shoe units 13, 13, are provided also at the leading edges of the stabilizing fins at the tail of the airplane for ice removal. Each unit comprises an envelope or cover of stretchable rubber 14, which encloses a plurality of inflatable tubes 15, 15, and which is attached along its edges to the airplane surface. The tubes are adapted to be inflated for the purpose of changing the surface contour to break up accumulated ice, in a manner for example as is disclosed in the W. C. Geer Patent No. 1,998,809 of April 23, 1935.

Preferably the units have metal fairing strips 16, 16, 17, 17, 18, 18, extending along the airplane surface at the margins of the units. The fairing strip may be held in place as by means of metallic screws, bolts, or rivets, 16a, 16a, 17a, 17a, 18a, 18a, extending through the strip unit and skin of the airfoil in the cases where the latter is of strong metal, or the attachment may be to the underlying structure of the airfoil.

The shoe units or portions thereof which are disposed in the air-stream of the propeller are often subjected to the depositing of oil on their surfaces from the motors, and the invention provides for oil-resistant protection to these surfaces so that the rubber of the shoes will not deteriorate because of the action of the oil and so that the electric conductivity, described more fully hereinafter, will be maintained despite the presence of the oil and the agitation caused by the air-flow.

For the purpose of providing electrical conductivity to the surface of the shoes, the rubber itself being undesirably low in such conductivity, especially in a condition of stretch, I provide a surface coating on the rubber that is electrically conductive, even when considerably stretched and at the same time preferably is oil-resisting; that is able to flex and stretch with the rubber without objectionable cracking and preferably able to contribute to its elasticity; and that is resistant to the action of sunlight. These results may be obtained by the application of a coating material comprising neoprene (polymerized 2-chloro-butadiene) having mixed therewith a substance that is highly conductive to electricity, preferably graphite in finely divided form. Good results have ben obtained with the use of graphite particles of about 2 or 3 microns in size.

Only a very thin layer of the neoprene-graphite coating need be applied to obtain the desired results, and this thin coating layer may be conveniently obtained by first providing a liquid dispersion of the neoprene and graphite composition for spreading. The dispersion may be in the form of either a solvent cement or an aqueous dispersion.

The following illustrative procedure is well adapted to the obtaining of a suitably thin and uniform coating of the neoprene-graphite composition, and it makes possible the strong union of this surface coating to the underlying rubber structure despite the fact that the neoprene and the rubber are not easily adhered to one another.

Upon a suitable support 24 is laid a backing sheet 25 having a smooth surface. This sheet may be of metal, preferably tinned to provide a smooth, rigid surface. Upon the surface of the backing sheet 25 is applied a layer 19 of a suitable lubricating material such, for example, as a suitable soap. Upon this is deposited a layer 20 of the neoprene-graphite dispersion, preferably by spraying, to provide a thin layer of uniform thickness. This layer may be built up to the desired thickness by applying successive coatings 20a, 20b, 20c, 20d, permitting each coat to dry at least partially before the succeeding coat or coats are applied. A layer 21 of neoprene dispersion without the graphite may be applied next, and upon this a layer 22 of intermixed neoprene and rubber, and a layer 23 of rubber, preferably in sheet form, may then be applied. By this composite structure, after vulcanization, a strong union or anchorage of the layers of the composite structure is provided despite the differences in materials.

Before vulcanization the tubes 15, 15, and the other parts of the shoe preferably are assembled upon the layer 23, and the whole, while it is still on the backing sheet 25, is then vulcanized, whereupon it may be stripped from the backing 25. The lubricant 19 facilitates such removal by preventing excessive adhesion of the neoprene-graphite layer to the backing 25, and where tinned metal is used for the backing sheet 25, a very smooth surface on the shoe unit results.

Upon mounting the shoe on the airplane with the conductive surface 20 outward and providing a suitable conductive connection to the metal of the aircraft, as by means of the fairing strips 16, 16, 17, 17, 18, 18, in contact with the surface 20 and metallic fastening elements 16a, 16a, 17a, 17a, 18a, 18a, passing through the strips, shoe and airplane skin, a direct path is provided for charges of electricity from the surface 20 to the metallic structure of the airplane.

For the lubricant 19, various substances may be used, such for example as salts of sulphated alcohols, soluble cellulose esters, various soaps, talc, soapstone and waterglass.

While neoprene is preferred as the binder for the highly conductive substance in the layer 20, the neoprene having the advantages of being highly resistant to the action of oil, to sun checking and to flex cracking and of being itself a better electrical conductor than soft rubber, other non-rubber materials having some or all of these characteristics to a suitable degree may be used, such, for example, as plasticized polymerized vinyl chloride, aliphatic polysulphide and plasticized chlorinated rubber. Graphite is preferred as the highly conductive substance in the layer 20, but other conductive substances may be used, such, for example, as metallic powders.

As an illustrative example, the following composition has given good results for the dispersion used to provide the coats of the layer 20:

Neoprene, 100 parts by volume
    Graphite, 35 parts by volume
    Softener, 5% by weight of neoprene
    Vulcanizing and age-resisting ingredients
    Solvent or aqueous dispersion vehicle The layer 21 may be the same as above, but omitting the graphite.

While it is preferred that the layers 20 and 21 be deposited by spraying, the dispersion may be of a suitable thickness for application for spreading as a paste, if desired. Instead of applying these layers directly on the sheet backing 25, they may be first deposited upon holland cloth or other surface and after the application of the layers 22 and 23, as by calendering, the plied material may be stripped from such surface and applied to the lubricated backing sheet 25. The layer 22 may comprise neoprene and rubber mixed in equal parts by weight with vulcanizing and age-resisting ingredients added. The rubber of the layer 23 may be of the rubber compositions ordinarily employed for the inflatable shoe units. These layers may be preliminarily sheeted, as by calendering and may be united by calendering before their incorporation in the composite structure.

As an alternative procedure, the neoprene-graphite composition may be applied directly to the surface of the rubber after the latter has been vulcanized. The neoprene-graphite composition may be applied to such surface as a dispersion, with either a solvent or aqueous liquid vehicle, by painting, spraying, or by spreading the composition on in the form of a thickened dispersion or paste. Preferably for the sake of obtaining a strong adhesion to the vulcanized rubber body, a tying layer of neoprene-rubber dispersion is applied to the surface of the article before the neoprene-graphite dispersion is applied.

While the invention is especially useful in its application to inflation shoes for ice-removal, it has utility also in the protection of surfaces of other structures of rubber, such, for example, as abrasion shoes and the side walls of tires, and the invention is useful also for the protection of surfaces of other articles whether they be of rubber, metal, fabrics, or other materials.

Variations may be made without departing from the scope of the invention as it is hereinafter claimed.

I claim:

1. Ice-removing apparatus for aircraft including a covering comprising a layer of extensible dielectric material adapted to be extensively stretched in the operation of said apparatus, and an extensible layer of material at the surface of the dielectric material of relatively great conductivity adapted to be stretched therewith and to be electrically conductive in a condition of stretch.

2. Ice-removing apparatus for aircraft including a covering comprising a layer of rubber adapted to be extensively stretched in the operation of said apparatus, and a layer of extensible neoprene composition upon said rubber and adapted to be stretched therewith, the neoprene layer including electrically conductive graphite and being conductive of electrical charges in a condition of stretch.

3. Apparatus of the class described comprising resiliently stretchable material subjected to extensive resilient distortion in the operation thereof, and a protective coating therefor comprising neoprene composition and particles of electrically conductive substance upon the surface of said material adapted to be distorted with said material and to present an electrically conductive surface of the material in its distorted condition.

4. Apparatus of the class described comprising rubber composition subjected to extensive resilient distortion in the operation thereof, a protective coating therefor comprising neoprene composition and graphite upon the surface of said rubber composition adapted to be distorted with the rubber composition and to be electrically conductive in the distorted condition of the coating, and an intermediate, distortable layer comprising intermixed rubber composition and neoprene adhering the coating of neoprene and graphite to the underlying rubber composition.

5. Apparatus of the class described comprising rubber composition subjected to extensive resilient distortion in the operation thereof, and a coating upon said rubber composition protecting the same from the effects of oil, sun and electrical charges, said coating comprising neoprene composition and graphite particles upon the surface of said rubber composition, the neoprene of said coating being effective to maintain protection to the rubber and electrical conductivity between the particles of graphite separated by the distortion of the coating.

6. Apparatus exposed to contact with oil comprising an oil-resisting surface layer including neoprene composition and an electrically conductive material in the neoprene layer for electrical conductivity of said layer.

7. Apparatus exposed to contact with oil and to fluid currents at high velocity comprising a body of rubber composition and an oil-resisting surface layer of neoprene composition and graphite particles dispersed in the neoprene layer for electrical conductivity of said layer.

8. Article of the class described comprising a layer of resilient, stretchable material adapted to be distorted, a protective coating on the surface thereof comprising, stretchable non-rubber but rubber-like material highly resistant to the action of sunlight and including particles of electrically conductive substance permitting distortion of the material and providing electrical conductivity of the surface in the distorted condition of the material, and an intermediate thin layer of stretchable binding material securing the protective coating to the underlying layer.

9. Article of the class described comprising a layer of resilient, stretchable material adapted to be distorted, a protective coating on the surface thereof comprising, stretchable non-rubber but rubber-like material highly resistant to the action of sunlight and including particles of electrically conductive substance permitting distortion of the material and providing electrical conductivity of the surface in the distorted condition of the material, and an intermediate thin layer of stretchable binding material securing the protective coating to the underlying layer, the intermediate layer including in part the non-rubber material of the protective coating and the resilient material of the underlying layer.

10. Article of the class described adapted to be extensively distorted in the use thereof, said article comprising a layer of resilient rubber material and a protective coating on the surface thereof comprising a thin layer of non-rubber but stretchable rubber-like composition highly resistant to the action of sunlight and including particles of electrically conductive substance, said coating permitting extensive distortion of the article while maintaining electrical conductivity of the surface thereof in its distorted condition.

11. Article of the class described adapted to be extensively stretched in the use thereof, said article comprising a layer of resilient stretchable material and a protective coating on the surface thereof comprising a thin layer of stretchable non-rubber but rubber-like composition highly resistant to the action of sunlight and including particles of electrically conductive substance, said coating permitting stretching of the article while maintaining electrical conductivity of the surface thereof in its stretched condition.

RICHARD A. CRAWFORD.